(12) United States Patent
Favata et al.

(10) Patent No.: US 8,419,416 B2
(45) Date of Patent: *Apr. 16, 2013

(54) NOZZLE ASSEMBLY FOR SUPPORTING SLIDE MOVEMENT OF A VALVE ASSEMBLY

(75) Inventors: Domenico Favata, Konz (DE); Claude François Wolf, Kanfen (FR); Peter Yankov, Bolton (CA); Kevin Francis Said, Toronto (CA); Darrin Albert McLeod, Jeffersonville, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,803

(22) Filed: Jul. 29, 2011

(65) Prior Publication Data

US 2012/0195997 A1    Aug. 2, 2012

Related U.S. Application Data

(63) Continuation-in-part of application No. 13/144,945, filed as application No. PCT/US2011/039533 on Jun. 8, 2011.

(60) Provisional application No. 61/353,673, filed on Jun. 11, 2010.

(51) Int. Cl.
*B29C 45/20* (2006.01)

(52) U.S. Cl.
USPC .............. 425/562; 264/328.14; 425/564

(58) Field of Classification Search .......... 425/562, 425/564
See application file for complete search history.

(56) References Cited

U.S. PATENT DOCUMENTS

| | | | |
|---|---|---|---|
| 3,952,927 A | 4/1976 | Schaumburg et al. | |
| 5,334,008 A | 8/1994 | Gellert | |
| 5,849,343 A | * 12/1998 | Gellert et al. | ................ 425/549 |
| 6,135,757 A | 10/2000 | Jenko | |
| 6,159,000 A | 12/2000 | Puri et al. | |
| 6,769,901 B2 | 8/2004 | Babin et al. | |
| 6,921,259 B2 | 7/2005 | Sicilia et al. | |
| 7,128,566 B2 | 10/2006 | Babin | |
| 7,513,772 B2 | 4/2009 | Fairy et al. | |
| 2008/0031997 A1 | 2/2008 | Bazzo et al. | |

FOREIGN PATENT DOCUMENTS

EP    0638407 B1    10/1997

* cited by examiner

*Primary Examiner* — Tim Heitbrink

(57) ABSTRACT

A mold-tool system (100) configured to accommodate a valve stem (104), the mold-tool system (100) comprising: a nozzle assembly (402) having: a nozzle-output end (408) being configured to support, at least in part, slide movement of the valve stem (104).

7 Claims, 3 Drawing Sheets

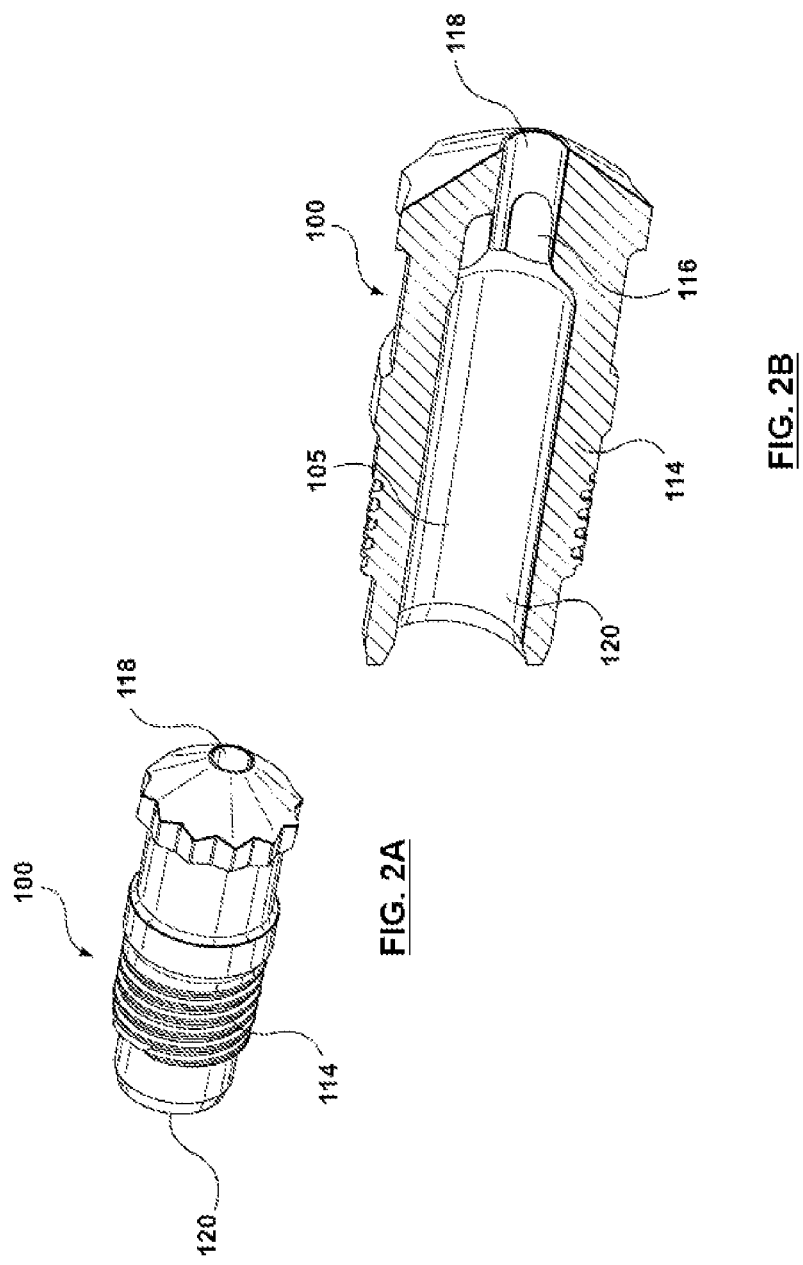

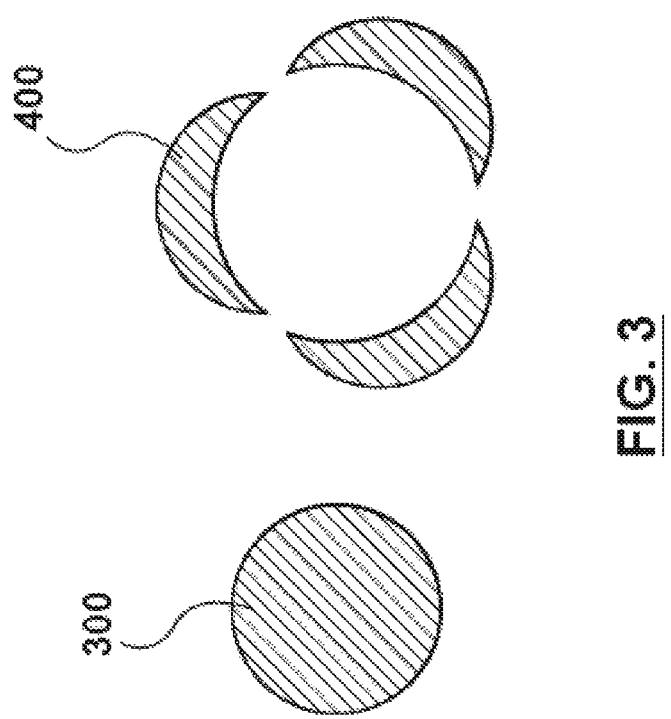

NOZZLE ASSEMBLY FOR SUPPORTING SLIDE MOVEMENT OF A VALVE ASSEMBLY

CROSS-REFERENCE TO RELATED PATENT APPLICATION(S)

This patent application is a continuation-in-part patent application of prior U.S. patent application Ser. No. 13/144,945, filed 18 Jul. 2011. This patent application also claims the benefit and priority date of prior PCT Application No. PCT/US2011/039,533, filed 8 Jun. 2011, which claims priority from prior U.S. Patent Application No. 61/353,673, filed 11 Jun. 2010.

TECHNICAL FIELD

An aspect of the present invention generally relates to (but is not limited to) a mold-tool system.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process. Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

Generally, known valve stems bend and deflect in a hot runner nozzle, which may inadvertently accelerate wear of a nozzle tip and a gate insert.

According to one aspect, there is provided a mold-tool system (100) configured to accommodate a valve assembly (104), the mold-tool system (100) comprising: a nozzle assembly (402) having: a nozzle-output end (408) being configured to support, at least in part, slide movement of the valve assembly (104).

According to another aspect, there is provided a molding system having the mold-tool system (100) described above.

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 2A and 2B depict other schematic representations of the mold-tool system (100) of FIG. 1; and FIG. 3 depicts a schematic representation of a flow area (400) of the mold-tool system (100) of FIG. 1.

Figure 1:
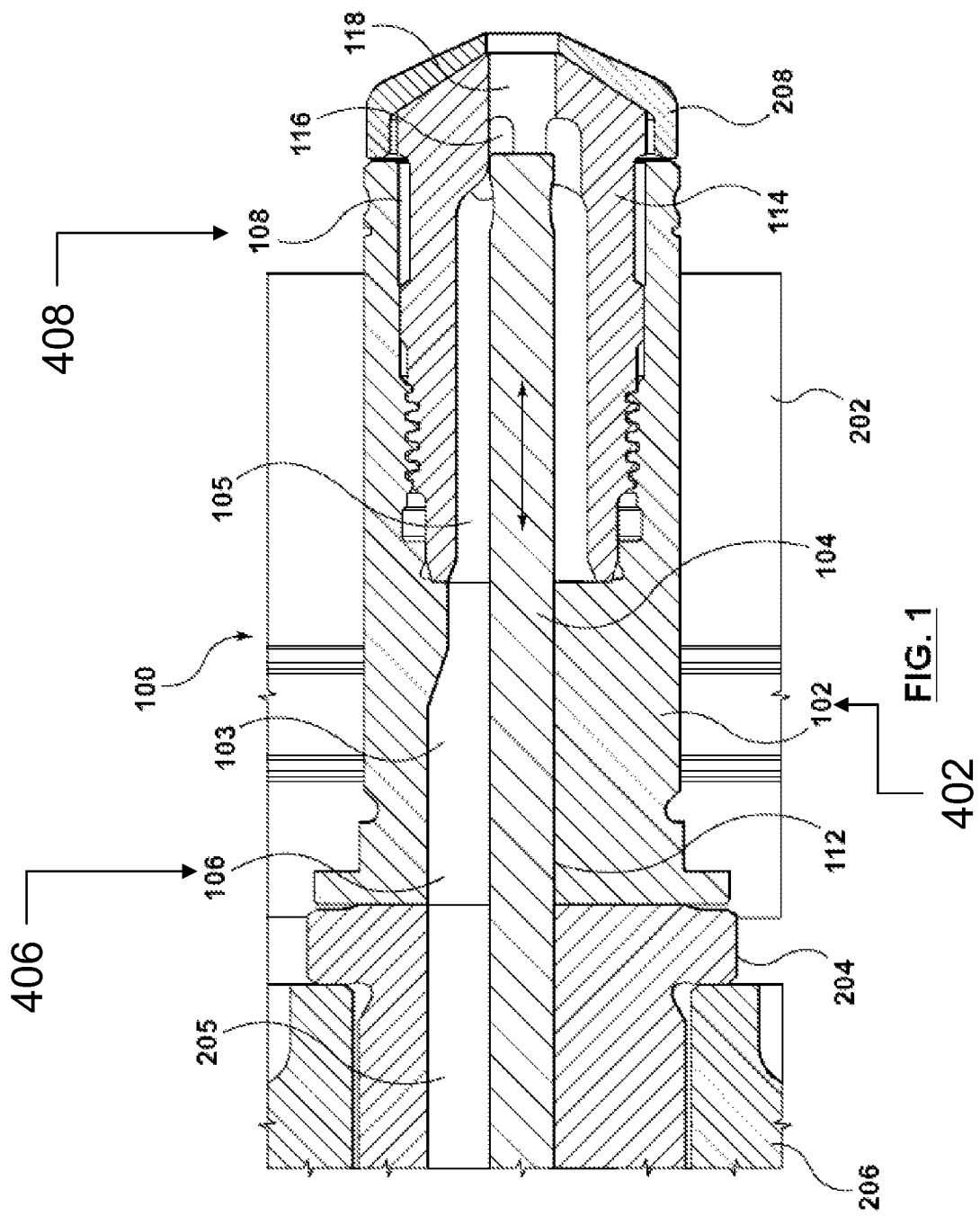
FIG. 1 depicts a schematic representation of a mold-tool system (100)

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the schematic representation of the mold-tool system (100). Specifically, FIG. 1 depicts a cross section of the mold-tool system (100). The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN:

0-412-99381-3), (iii) *"Injection Molding Systems"* 3rd Edition authored by JOHANNABER (ISBN 3-446-17733-7) and/or (iv) *"Runner and Gating Design Handbook"* authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The mold-tool system (100) includes (but is not limited to): a synergistic combination of a nozzle housing (102) and a valve stem (104). The nozzle housing (102) may be called a nozzle body. The nozzle housing (102) has or defines a melt passageway (103) that extends from an input end (106) to an output end (108) along a longitudinal axis of the nozzle housing (102). The output end (108) is offset (or spaced apart) from the input end (106). The melt passageway (103) is used for conveying a melt (also known as a resin) from a runner assembly (known but not depicted) to a mold assembly (known but not depicted). The valve stem (104) is slide movable along the melt passageway (103). The valve stem (104) is slide supported at the input end (106) and at the output end (108). "Slide supported" is defined such that when the valve stem (104) is slide reciprocated between open position and closed position, a tip of the valve stem (104) is continuously slide supported (or guided) at the output end (108) so as to prevent the tip of the valve stem (104) from not being guided at the output end (108). It will be appreciated that the meaning of "the valve stem (104) is slide supported at the input end (106)" covers either option of having the valve stem (104) being supported at the input end (106) and/or being supported at the manifold bushing (204). FIG. 1 depicts the valve stem (104) in the open position so that the melt may flow through the nozzle housing (102) into the mold assembly.

The nozzle housing (102) is received and held in position by a manifold plate (202). The nozzle housing (102) abuts an end of a manifold bushing (204), The manifold bushing (204) is received in a manifold assembly (206). The manifold bushing (204) also defines a melt passageway (205) that fluidly connects with the melt passageway (103) of the nozzle housing (102). The valve stem (104) slideably moves through the manifold bushing (204). According to non-limiting variation, the output end (108) slide supports the valve stem (104) throughout an entire stroke of the valve stem (104).

According to a non-limiting option, the mold-tool system (100) may further include (but is not limited to) a nozzle tip (114). It will be appreciated that the nozzle tip (114) provides a structure for centering the valve stem (104) relative to the nozzle housing (102). The nozzle tip (114) defines or includes a tip passageway (105) that is fluidly connected with the melt passageway (103) of the nozzle housing (102). The nozzle tip (114) is received in the output end (108) of the nozzle housing (102). The nozzle tip (114) may be assembled to the nozzle housing (102) with a tool, such as a wrench. The valve stem (104) is slidably supported by the nozzle tip (114). Generally, the nozzle tip (114) is connected with the nozzle housing (102). According to an option the nozzle tip (114) is connectably detachable to the nozzle housing (102) such as by way of a threaded connection. A vespel (208) may be used to cover a tip of the nozzle tip (114) at an exit portal (118) of the nozzle tip (114). The nozzle tip (114) also includes an entrance portal (120), and the melt passageway (103) extends from the entrance portal (120) to the exit portal (118). The entrance portal (120) is positioned offset (or spaced apart) from the exit portal (118). According to an option, the nozzle tip (114) may have a flute structure (116) that is configured to allow a melt to flow around the valve stem (104) to the output end (108), and the flute structure (116) is used to support the valve stem (104) at the output end (108). The flute structure (116) includes a flute defined at the exit portal (118) of the nozzle tip (114).

FIGS. 2A and 2B depict other schematic representations of the mold-tool system (100) of FIG. 1. FIG. 2A depicts an isometric view of the nozzle tip (114). FIG. 2B depicts a cross-sectional view of the nozzle tip (114). The flute structure (116) defines a set of flutes that faces the valve stem (104), and each flute is located evenly around the valve stem (104). The flute structure (116) is offset from the exit portal (118) of the nozzle tip (114). The flute structure (116) may include a flute which is formed in the exit portal (118).

FIG. 3 depicts a schematic representation of a flow area (400) of the mold-tool system (100) of FIG. 1. The flute structure (116) is positioned proximate to an exit portal (118) of the nozzle tip (114). The flute structure (116) is configured to allow plastic to flow around the valve stem (104) that is placed in an open position. The valve stem (104) is movable between an open position and a closed position. In the closed position, a tip of the valve stem (104) seals with a portion of the nozzle tip (114). In the opened position, the tip of the valve stem (104) does not seal with the portion of the nozzle tip (114) so that the melt may flow freely from the melt passageway (103) through the flute structure (116) to the exit end of the nozzle housing (102).

The flute structure (116) forms a flow area (400) surrounding the valve stem (104) when the valve stem (104) is placed in the open position is equal to the flow area (300) defined by a cross sectional area of the exit portal (118) of the nozzle tip (114), so that the flow area (400) may be maintained while at the same time the valve stem (104) is supported.

Technical Advantages

Assuring that the valve stem (104) remains centered inside the melt passageway (103) of the nozzle housing (102) and nozzle tip (114) may result in: (A) a better homogenized melt temperature and viscosity distribution around the valve stem (104), (B) a reduction in wear associated with the nozzle tip (114), the valve stem (104) and a gate insert (not depicted), (C) improved preform gate nub quality, (D) possible solution for gate tearing regardless of the type of valve stem (104) used (straight type, pressure-relief type, etc), (E) reduction in melt flow lines with colorants and additives due to the shadow side of a valve stem (104), and/or (F) improvement of hot runner balancing.

Referring back to FIG. 1, the mold-tool system (100) is configured to accommodate a valve stem (104). The mold-tool system (100) includes (and is not limited to): a nozzle assembly (402) that has a nozzle-output end (408). The nozzle-output end (408) is configured to support, at least in part, slide movement of the valve stem (104). The following are contemplated variations: the nozzle assembly (402) defines, at least in part, a melt passageway (103) that is configured to accommodate slide movement of the valve stem (104). The nozzle assembly (402) has a nozzle-input end (406) that is configured to support, at least in part, slide movement of the valve stem (104). The nozzle-input end (406) is configured to interface with a manifold bushing (204). The manifold bushing (204) is configured to support, at least in part, slide movement oft the valve stem (104). The nozzle assembly (402) has a melt passageway (103) that extends from the nozzle-input end (406) to the nozzle-output end (408). The nozzle-output end (408) is set apart from the nozzle-input end (406). The nozzle-output end (408) includes (and is not limited to): a flute structure (116) that is configured to support, at least in part, slide movement of the valve stem (104). Optionally, the nozzle assembly (402) includes (and is not limited to) a nozzle tip (114) that is configured to be received in the nozzle-output end (408). The nozzle tip (114) has the flute structure (116) that is configured to support, at least in part, slide movement of the valve stem (104). The flute structure (116) is configured to allow a melt to flow around the valve stem (104) to the nozzle-output end (408). The valve stem (104) is slidably supported by the nozzle tip (114) at the flute structure (116). The output end (408) slide supports the valve stem (104) throughout an entire stroke of the valve stem (104). The nozzle tip (114) is received in the output end (408) of the nozzle assembly (402). The valve stem (104) is slidably supported by the nozzle tip (114). The flute structure (116) is configured to allow a melt to flow around the valve stem (104) to the output end (108). The valve stem (104) is slidably supported by the nozzle tip (114) at the flute structure (116). The flute structure (116) is positioned proximate to an exit portal (118) of the nozzle tip (114). The flute structure (116) is configured to allow plastic to flow around the valve stem (104) that is placed in an open position. The flute structure (116) forms a flow area (400) surrounding the valve stem (104) when the valve stem (104) is placed in the open position is equal to the flow area defined by a cross sectional area of the exit portal (118) of the nozzle tip (114), so that the flow area may be maintained while at the same time the valve stem (104) is supported.

Additional Description

The following clauses are offered as further description of the aspects of the embodiments of the present invention:

Clause (1). A mold-tool system (100), comprising: a nozzle housing (102) having a melt passageway (103) extending from an input end (106) to an output end (108) being offset from the input end (106); and a valve stem (104) being: (i) slide movable along the melt passageway (103), and (ii) slide supported by the input end (106) and by the output end (108). Clause (2). The mold-tool system (100) of clause (1), wherein: the output end (108) slide supports the valve stem (104) throughout an entire stroke of the valve stem (104). Clause (3). The mold-tool system (100) of any preceding clause, further comprising: a nozzle tip (114) being received in the output end (108) of the nozzle housing (102), and the valve stem (104) is slidably supported by the nozzle tip (114). Clause (4). The mold-tool system (100) of any preceding clause, further comprising: a nozzle tip (114) being received in the output end (108) of the nozzle housing (102), the nozzle tip (114) having: a flute structure (116) being configured to allow a melt to flow around the valve stem (104) to the output end (108), and the valve stem (104) is slidably supported by the nozzle tip (114) at the flute structure (116). Clause (5). The mold-tool system (100) of any preceding clause, wherein: the flute structure (116) is positioned proximate to an exit portal (118) of the nozzle tip (114), the flute structure (116) is configured to allow plastic to flow around the valve stem (104) that is placed in an open position. Clause (6). The mold-tool system (100) of any preceding clause, wherein: the flute structure (116) forms a flow area (400) surrounding the valve stem (104) when the valve stem (104) is placed in the open position is equal to the flow area (300) defined by a cross sectional area of the exit portal (118) of the nozzle tip (114), so that the flow area (400) may be maintained while at the same time the valve stem (104) is supported. Clause (7). A molding system having the mold-tool system (100) of any of any preceding clause.

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope of the independent claims. It is understood that the non-limiting embodiments are merely illustrative.

What is claimed is:

1. A mold-tool system (100) configured to accommodate a valve stem (104), the mold-tool system (100) comprising:
   a nozzle assembly (402) having:
      a nozzle-output end (408) being configured to support, at least in part, slide movement of the valve stem (104), and
      a nozzle tip (114) being received in the nozzle-output end (408), the nozzle tip (114) including:
         a flute structure (116) positioned proximate to an exit portal (118) of the nozzle tip (114), the flute structure (116) configured to slidably support the valve stem (104) while at the same time maintaining a flow area (400) surrounding the valve stem (104) along the entire length that the valve stem (104) is slidably supported by the flute structure (116) when the valve stem (104) is placed in the open position, the flow area (400) being equal to the flow area (300) defined by a cross sectional area of the exit portal (118) of the nozzle tip (114).

2. The mold-tool system (100) of claim 1, wherein:
   the nozzle assembly (402) defines, at least in part, a melt passageway (103) being configured to accommodate slide movement of the valve stem (104).

3. The mold-tool system (100) of claim 1, wherein:
   the nozzle assembly (402) has a nozzle-input end (406) being configured to support, at least in part, slide movement of the valve stem (104).

4. The mold-tool system (100) of claim 1, wherein:
   the nozzle assembly (402) has a nozzle-input end (406) being configured to interface with a manifold bushing (204), the manifold bushing (204) being configured to support, at least in part, slide movement of the valve stem (104).

5. The mold-tool system (100) of claim 1, wherein:
the nozzle assembly (402) has a melt passageway (103) extending from an nozzle-input end (406) to the nozzle-output end (408) being set apart from the nozzle-input end (406).

6. The mold-tool system (100) of claim 1, wherein:
the output end (408) slide supports the valve stem (104) throughout an entire stroke of the valve stem (104).

7. A molding system having the mold-tool system (100) of any one of claims 1-5 and 6.

* * * * *